Patented Jan. 21, 1947

2,414,742

UNITED STATES PATENT OFFICE 2,414,742

SOLUTIONS OF WATER-INSOLUBLE METAPHOSPHATES

Henry A. Jackson, Mount Lebanon, Pa., assignor to Hall Laboratories, Inc., Pittsburgh, Pa., a corporation of Pennsylvania No Drawing. Application April 2, 1941,
Serial No. 386,501

6 Claims. (Cl. 106—48)

This invention relates to aqueous solutions of water-insoluble metaphosphate, and more particularly to highly viscous aqueous solutions of such metaphosphates, the viscous solutions being suitable as vehicles for ceramic pigments for forming a vitreous or ceramic paint or enamel.

The present application is a continuation-in-part of my application, Serial No. 143,129, filed May 17, 1937.

The viscosity of these highly viscous, aqueous solutions is unusually great, surpassing the viscosity of solutions of almost all other inorganic materials and approaching in viscosity materials such as glue, bentonite suspensions and the like.

I have found that ceramic pigments may be mixed with a viscous aqueous solution of metaphosphates to form a paint or enamel which is suitable for decorating ceramics or glassware. After the paint is applied, the ceramic article may be burned to vitrefy it, leaving a hardened film on the article. The vitreous metaphosphate paint may be used in place of ceramic paints now known which consist of a pigment and an oil as a vehicle. My paint has the advantage that upon burning the article, a hard vitreous film is formed which has good adherence to the article.

The metaphosphate which I prefer to use in forming the viscous aqueous solution which may be employed as a vehicle for ceramic pigments is crystalline potassium metaphosphate ($KPO_3$). Crystalline potassium metaphosphate is substantially water-insoluble, so that it is not suitable when used for forming aqueous solutions. Crystalline potassium metaphosphates may be made by the dehydration of monopotassium orthophosphate at elevated temperature, for example at a red heat. It may be made at a temperature as low as 300° C. by heating until no more water is evolved, or it may be made by heating to above the melting point of potassium metaphosphate, which is approximately 810° C., and allowing the melt to cool. The solubility of crystalline potassium metaphosphate is approximately 40 P. P. M. in distilled water ("Potassium metaphosphate: a potential high-analysis fertilizer material," by S. L. Madorsky and K. G. Clark, in "Industrial and Engineering Chemistry," vol. 32, pages 244–8 [1940]). As contrasted with this, the solubility of glassy sodium metaphosphate commonly known as Graham's salt is almost unlimited. Solutions containing as much as 30 or 40% by weight can readily be prepared in a short period of time. Therefore, by comparison crystalline potassium metaphosphate is substantially water-insoluble and we have thus characterized it in this application.

I have found, however, that a viscous aqueous solution of the water-insoluble crystalline potassium metaphosphate may be made by dissolving the potassium metaphosphate in an aqueous solution containing ammonium salts or salts of alkali-metals other than potassium. I have found that aqueous solutions of sodium, ammonium or lithium salts have the property of bringing about the dissolution of the water-insoluble potassium metaphosphate in aqueous solutions. For example, I have employed sodium metaphosphate, sodium chloride, ammonium chloride, sodium carbonate and lithium chloride separately in aqueous solutions for bringing about the dissolution of the crystalline water-insoluble potassium metaphosphate. The sodium metaphosphate may be either the glassy sodium metaphosphate commonly known as sodium hexametaphosphate ($NaPO_3)_6$ or Graham's salt, or the water-soluble crystalline sodium metaphosphate commonly known as sodium trimetaphosphate ($NaPO_3)_3$. I may even use as the dissolving agent for the crystalline potassium metaphosphate the crystalline form of sodium metaphosphate commonly known as Maddrell salt, which is sometimes referred to as "insoluble" sodium metaphosphate. This Maddrell salt is much less soluble than the Graham's salt or sodium trimetaphosphate but nevertheless is sufficiently soluble to cause the formation of a viscous solution of crystalline potassium metaphosphate after a considerable time. A 10% aqueous solution of sodium trimetaphosphate in distilled water can readily be made.

The manner of making glassy sodium metaphosphate commonly known as sodium hexametaphosphate or Graham's salt, the crystalline sodium trimetaphosphate and the so-called "insoluble" form of sodium metaphosphate are fully disclosed in the paper by Partridge, Hicks and Smith entitled "A thermal, microscopic, and X-ray study of the system $NaPO_3$—$Na_4P_2O_7$," in the "Journal of the American Chemical Society" for February 1941. Briefly, the glassy sodium metaphosphate may be made by heating to fusion monosodium dihydrogen orthophosphate and rapidly cooling the melt. The sodium trimetaphosphate may be made by heating monosodium dihydrogen orthophosphate to a temperature between 500° C. and its melting point of 625° C. or by slow cooling from above the melting point. The "insoluble" form or forms of sodium metaphosphate may be made by heating monosodium dihydrogen orthophosphate in the temperature range between 300° C. and 475° C.

A highly viscous potassium metaphosphate solution suitable for use as a vehicle for ceramic pigments may be made by mixing 10 grams of water-insoluble crystalline potassium metaphosphate in 80 ml. water and adding thereto a solution of 10 grams sodium metaphosphate (Graham's salt) in 30 ml. of water. It is of course to be understood that instead of adding a solution of sodium metaphosphate to the water containing potassium metaphosphate, the sodium metaphosphate may be mixed with the potassium metaphosphate and the mixture added to the water, but it is more difficult to obtain a satisfactory product in this manner for as soon as the otherwise insoluble particles of potassium metaphosphate come in contact with the sodium salt solution, they gelatinize on the surface and it is difficult to get them wholly into solution. This is also the case where other salts are employed for causing the dissolution of the metaphosphate in water. A solution of potassium metaphosphate in sodium metaphosphate is preferred since it is substantially more viscous than a solution of potassium metaphosphate in other sodium salts such as sodium chloride.

Other water-insoluble metaphosphates may be employed in place of the crystalline potassium metaphosphate. Lead metaphosphate $Pb(PO_3)_2$ may be made by heating lead nitrate and phosphoric acid to a temperature of about 415° C. The lead metaphosphate may then be dissolved in an aqueous solution of ammonium sulphide to form a viscous metaphosphate paint vehicle. This viscous metaphosphate solution mixes well with ceramic pigments, may be easily applied to the article with a brush and forms a hard adherent film when burned at a temperature of about 800° C.

The viscous metaphosphate solution is capable of being used for other purposes than as a vehicle for ceramic pigments. It may be used as a ceramic cement or bond for refractories and for other purposes which involve heating the solution to a high temperature to form a hard adherent film.

The invention is not limited to the examples given or the preferred methods, but may be otherwise embodied or practiced within the scope of the following claims.

I claim:

1. A vitreous paint or enamel containing a ceramic pigment and a viscous aqueous solution resulting from dissolving crystalline water-insoluble potassium metaphosphate in water containing a water soluble inorganic salt of the class consisting of ammonium salts and salts of an alkali-metal other than potassium.

2. A vitreous paint or enamel containing a ceramic pigment and a viscous aqueous solution resulting from dissolving crystalline water-insoluble potassium metaphosphate in an aqueous solution of a water soluble inorganic sodium salt.

3. A vitreous paint or enamel containing a ceramic pigment and a viscous aqueous solution resulting from dissolving crystalline water-insoluble potassium metaphosphate in an aqueous solution of sodium metaphosphate.

4. A ceramic paint vehicle adapted and intended for use with ceramic pigments in the production of ceramic paints, said vehicle comprising at room temperature a viscous aqueous solution resulting from dissolving crystalline water-insoluble potassium metaphosphate in an aqueous solution of water soluble inorganic salt of the class consisting of ammonium salts and salts of an alkali-metal other than potassium.

5. A ceramic paint vehicle adapted and intended for use with ceramic pigments in the production of ceramic paints, said vehicle comprising at room temperature a viscous aqueous solution resulting from dissolving crystalline water-insoluble potassium metaphosphate in an aqueous solution of water soluble inorganic sodium salt.

6. A ceramic paint vehicle adapted and intended for use with ceramic pigments in the production of ceramic paints, said vehicle comprising a viscous aqueous solution resulting from dissolving crystalline water-insoluble potassium metaphosphate in an aqueous solution of sodium metaphosphate.

HENRY A. JACKSON.